US005789709A

United States Patent [19]
Luers et al.

[11] Patent Number: 5,789,709
[45] Date of Patent: Aug. 4, 1998

[54] ADJUSTABLE BUSWAY END BOX

[75] Inventors: Allan P. Luers, W. Burlington, Iowa; Louis A. Rosen, Wallingford; Eric J. Graham, Farmington, both of Conn.

[73] Assignee: General Electric Company, New York, N.Y.

[21] Appl. No.: 701,915

[22] Filed: Aug. 30, 1996

[51] Int. Cl.$^6$ .................................................. H02G 5/06
[52] U.S. Cl. ............................................... 174/71 B
[58] Field of Search ................... 174/50, 68.2, 70 B, 174/71 B, 72 B; 220/3.7, 8, 501, 527, 528, 553, 554, 555; 361/601, 611, 355

[56] References Cited

U.S. PATENT DOCUMENTS

| | | | |
|---|---|---|---|
| 3,281,522 | 10/1966 | Anisfield | 174/50 |
| 4,349,220 | 9/1982 | Carroll et al. | 285/121 |
| 5,162,616 | 11/1992 | Swaffield et al. | 174/70 B |

OTHER PUBLICATIONS

UL 857 Underwriter Laboratories Inc. Standard for Safety—Busways and Associated Fittings Sections 5 and 18.1 Jan. 8, 1989.

*Primary Examiner*—Kristine L. Kincaid
*Assistant Examiner*—Joseph Waks
*Attorney, Agent, or Firm*—Carl B. Horton; Fishman, Dionne, Cantor & Colburn

[57] ABSTRACT

An improved busway end box construction of the present invention terminates a busway run and provides insulation between the phase bars and the ground bar. The assembly includes an adjustable-height enclosure and an insulation sub-assembly. Adjustment slot in the top cover of the enclosure allows the top cover of the end box enclosure to slidably move up or down, varying the height of the busway end box. The insulator sub-assembly includes insulating walls nesting in between U-shaped comb-like brackets. Notches in the insulating walls provide vertical height to the insulator walls, allowing the insulator sub-assembly height to be self-adjusted as the height of the busway end box varies.

5 Claims, 2 Drawing Sheets

1
ADJUSTABLE BUSWAY END BOX

BACKGROUND OF THE INVENTION

Our invention relates to electric power distribution systems of the type commonly referred to as "busways," and more particularly to an end box to terminate a busway run.

An end box is used to terminate a busway run in a busway system. The end box wraps around the busway housing enclosure and provides insulation between the phase bars and the ground bar. In the manufacturing and installation processes, the width of a busway stays relatively constant but the height often changes for various reasons, e.g., the thickness of the bus bar insulators used often varies. The variation in the housing enclosure height makes the installation of the end box rather difficult.

Busway enclosure installation has to comply with UL standards. UL-857 section 18.1 as applied to busways and associated fittings specifies that the enclosure of an unventilated busway shall have no opening for ventilation and no opening with a minor dimension exceeding 1/16 inch (0.062 inch). If the busway enclosure height is too short for the end box, the installer has to force the end box onto the housing enclosure for it to fit, making the installation difficult. If the busway enclosure height is too tall for the end box, the air gaps between the busway housing and the end box after installation are often over 1/4 inch (0.025 inch), exceeding the size of the UL allowable opening.

OBJECTS OF THE INVENTION

It is an object of the present invention to provide a novel and improved busway end box which can be adjusted to the height of the busway housing enclosure and suitable for use on any busway fittings, lengths, or connections.

A further object of this invention is to provide an end box construction which is simple to manufacture and assemble, as well as being easy to install It is another object of this invention to provide an end box construction that decreases field installation time and improves work safety.

Further objects and features of the invention will be readily apparent to those skilled in the art from the following specification which includes the appended claims and drawings.

SUMMARY OF THE INVENTION

The invention, accordingly, provides an improved busway end box construction comprising a multi-sided partial enclosure unit with an access opening for receiving a busway run terminal, and a sub-assembly of insulation walls. The enclosure unit includes a top pan, a lower pan, and a trough shaped partial enclosure. An adjustment fastener going through a slot in the top pan fastens the top pan to the end box enclosure unit and allows the top cover pan to slidably move up or down to vary the height of the busway end box. The insulator sub-assembly includes insulating walls nesting in U-shaped comb-like brackets fastened to the top and lower pans of the end box Notches in the insulating walls allow them to be self-aligned in the brackets and provide vertical height for self-adjustment.

DESCRIPTION OF THE PREFERRED EMBODIMENT

Figure 1:
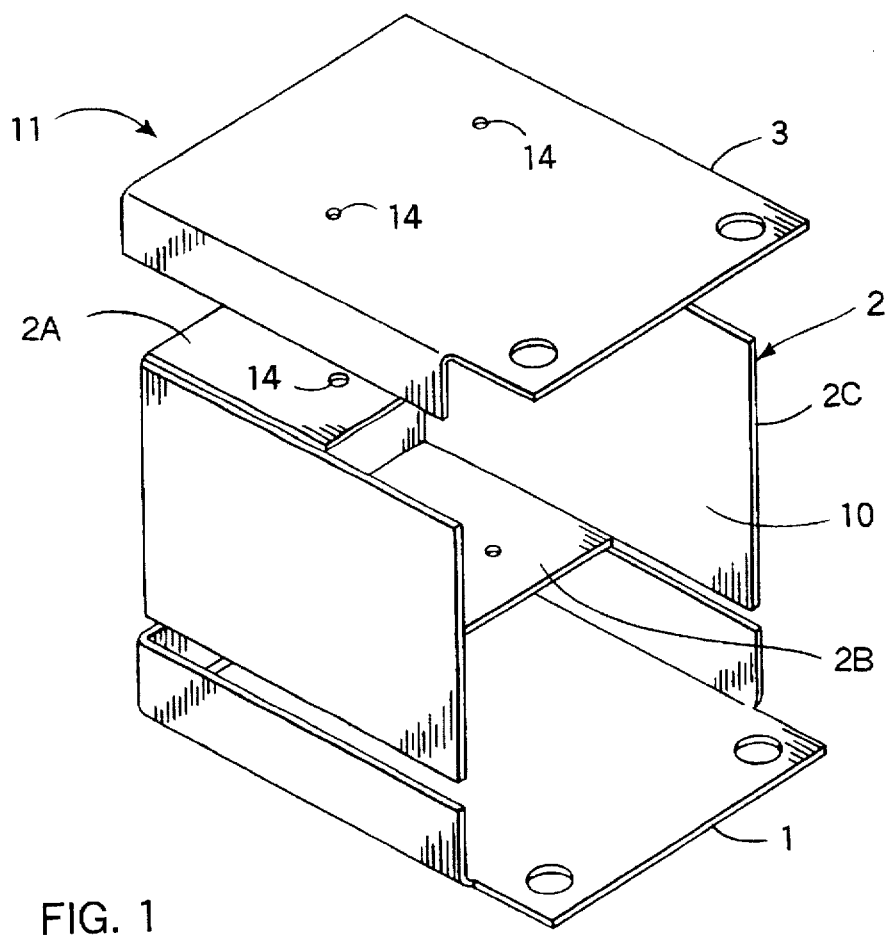
FIG. 1 is exploded view of the end box enclosure in accordance with the instant invention.
Figure 2:
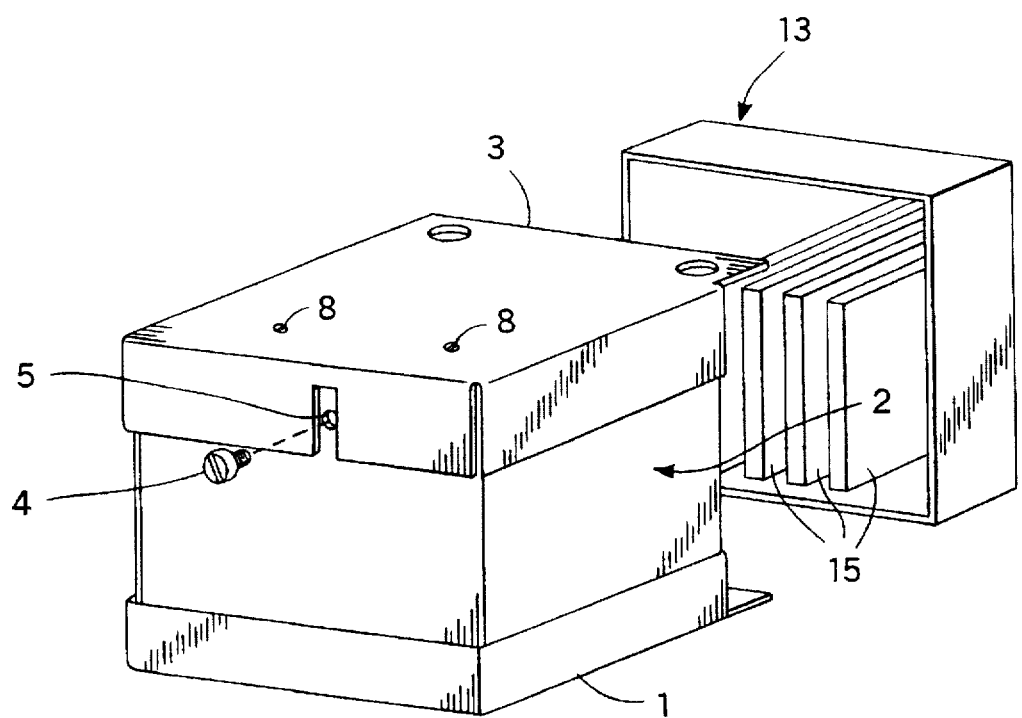
FIG. 2 perspective view showing the back of the end box enclosure with the adjustable part being the top pan.

An exemplary embodiment of the adjustable end box is shown in FIG. 1 with an assembly of a multi-sided partial enclosure 2 hereinafter called a trough, two open cover pans, a 1,3 and an access opening 10. The end box 11 enclosure is made out of either steel or aluminum sheet metal with thickness conforming to UL-857 specifications for busway enclosure 11. The trough 2 is an open box configuration with an opening being an access opening 10 for receiving a busway run terminal, 13 two partial sides 2A and 2B, and a three-sided sidewall 2C with the sides of the trough being connected together in some fashion such as spot-welding or continuous-welding at the seams. One of the cover pans can also connected to the sides of the trough 2 in a similar fashion. There are screw holes in the cover pans as well as in the partial sides 2A and 2B of the trough to fasten the cover pans 1,3 as well as the insulator sub-assembly 14 (see FIG. 3) to the cover pans. The top cover pan 3' as shown in FIG. 2, is preferably fastened to the trough 2 by a fastener such as an adjustment screw 4 going through an adjustment slot 5 at the back of the cover pan. After the adjustment screw 4 is tightened, fasteners such as adjustment screws 8 going through screw holes 14 in the top cover pan and top side 2A can be used to farther secure the cover pan 3 in place.

Figure 3:
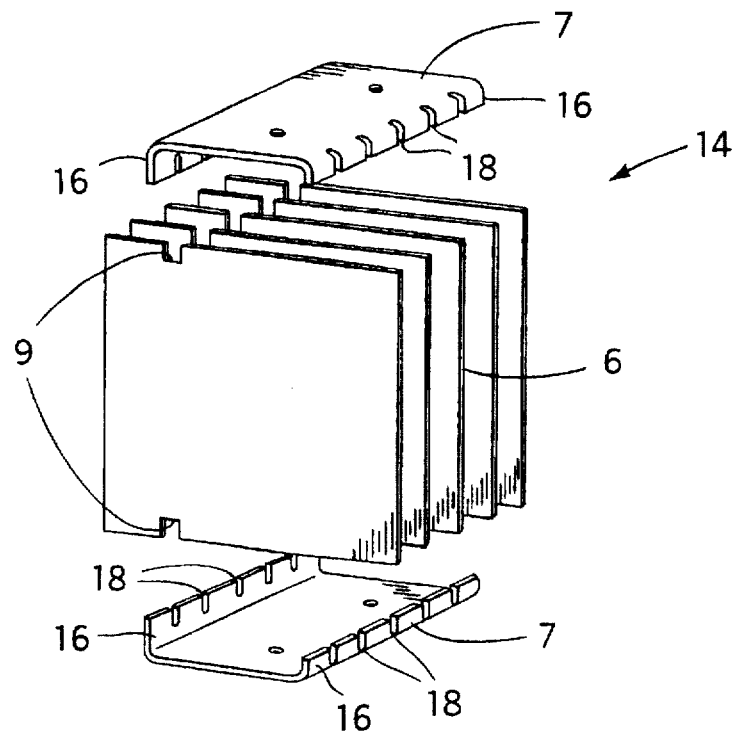
FIG. 3 exploded view of the insulator sub-assembly.

FIG. 2 shows the back of the end box enclosure with an adjustable top cover pan 3. Slot 5 at the back of the top cover pan 3 allows the height of the end box enclosure to be adjusted. Prior to installation, a fastener such as adjustment screw 4 is loosened to allow the top cover pan to be removed or to set the end box enclosure at its maximum height with the top cover pan being attached. After the end box enclosure is slipped onto a busway run terminal, the installer adjusts the top cover pan to ensure that the air gap between the busway (not shown) housing and the end box enclosure is at a minimum to meet UL requirements. After the desirable height is obtained, the adjustment screw 4 is tightened to secure the end box enclosure in place around the busway run terminal FIG. 3 is an exploded view of the insulator sub-assembly 14 with insulating walls 6 to separate the end stubs of the phase and ground bus bars 15 of the busway run terminal. The insulator sub-assembly comprises a top bracket and a bottom bracket 7 and a plurality of insulating walls 6. There are screw holes in the center of each bracket to fasten the bracket to the top (or bottom) cover pan of the end box enclosure 11. The brackets are metal plates with the two opposite edges 16 extending perpendicularly upward (for the bottombracket) or downward (for the top bracket). There are two rows of parallel open slits, 18 one on each of the two opposite edges of the brackets, forming U-shaped comb-like nests to retain the insulating walls 6 in vertical position between the brackets. There is a top notch and a bottom notch 9 in the two opposite sides of each insulating wall. When the notches are aligned in the open slits of the brackets, they provide vertical travel to adjust the height of the insulator walls while the end box is being wrapped around the busway run terminal. The alignment of the notches in the open slits 18 keeps the insulating walls stable in the insulator sub-assembly 14.

Figure 4:
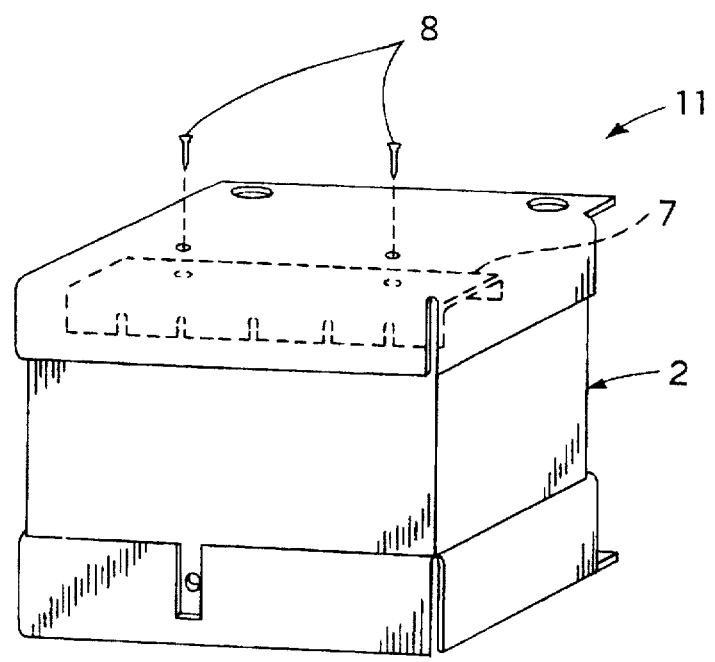
FIG. 4 is a perspective view showing the incorporation of the insulator sub-assembly to the enclosure.

To assemble the insulator sub-assembly 14 in the end box enclosure 11 first the insulating walls are assembled in between the two rows of open slits, 18 with the top and bottom notches 9 being aligned with the first row of open slits. After this sub-assembly 14 is slid into the trough, the 2 brackets 7 are fastened to the trough by fasteners such as screws or rivets 8 as shown in FIG. 4.

It will be understood that the invention is not limited to the specific forms shown above. Variations of the invention are set forth in the following claims.

What is claimed is:

1. A busway end box to terminate a busway run having a plurality of spaced bus bars; said busway end box comprising:

a multi-sided partial enclosure unit having three side walls defining an access opening for receiving the busway run, a first side opening and a second side opening, said first side opening opposing said second side opening;

first and second open cover pans to cover said first and second side openings respectively, each of said open cover pans having four walls, one wall of said four walls extending forward facing the busway run, and other three walls of said four walls extending perpendicularly inward for partially overlapping the thee, side walls of said partial enclosure unit;

a first fastener for attaching said first open cover pan to said enclosure unit; and a second fastener passing through a slot disposed in one of said other three walls of said second open cover pan for adjustably attaching said second open cover pan to said partial enclosure unit at a desired vertical spacing therebetween.

2. The busway end box of claim 1, wherein said end box further comprises an insulator sub-assembly to provide insulation between the bus bars, said insulator sub-assembly comprising:

a plurality of insulation walls, said insulation walls having a top notch and a bottom notch at opposing edges and a first mounting bracket and a second mounting bracket for retaining said insulation walls, said first mounting bracket secured to said first open cover pan and said second mounting bracket secured to said second open cover pan, each of said mounting brackets comprising a plate with two opposite edges extending inwardly, each of said edges of each of said mounting brackets having a plurality of parallel open slits for retaining said insulation walls, one of said edges of each of said mounting brackets being aligned with said top and bottom notches of each of said plurality of insulation walls to permit vertical adjustment of said second open cover pan.

3. The busway end box of claim 1, wherein said first fastener passes through another slot disposed in one of said other three walls of said first open cover pan for adjustably attaching said first open cover pan to said partial enclosure unit at a desired vertical spacing therebetween.

4. A busway end box to terminate a busway run having a plurality of spaced bus bars; said busway end box comprising:

a mold-sided partial enclosure unit having three side walls and an adjacent bottom wall defining an access opening for receiving the busway run, and a side opening, said side opening opposing said bottom wall;

an open cover pan for covering said side opening, said open cover pan having four walls, one wall of said four walls extending forward facing the busway run, and other three walls of said four walls extending perpendicularly inward for partially overlapping the three side walls of said partial enclosure unit; and a fastener passing through a slot disposed in one of said other three walls of said open cover pan for adjustably attaching said open cover pan to said partial enclosure unit at a desired vertical spacing therebetween.

5. The busway end box of claim 4, wherein said end box further comprises an insulator sub-assembly to provide insulation between the bus bars, said insulator sub-assembly comprising:

a plurality of insulation walls each said insulation walls having a notch at an edge thereof; and at least one mounting bracket for retaining said insulation walls, said mounting bracket secured to said open cover pan, said mounting bracket comprising a plate with two opposite edges extending inwardly, each of said edges of said mounting bracket having a plurality of parallel open slits for retaining said insulation walls, one of said edges of said mounting bracket being aligned with said notch of each of said plurality of insulation walls to permit vertical adjustment of said open cover pan.

* * * * *